No. 778,227. PATENTED DEC. 27, 1904.
F. M. DEVORE.
COW MILKER.
APPLICATION FILED MAR. 28, 1904.
2 SHEETS—SHEET 1.
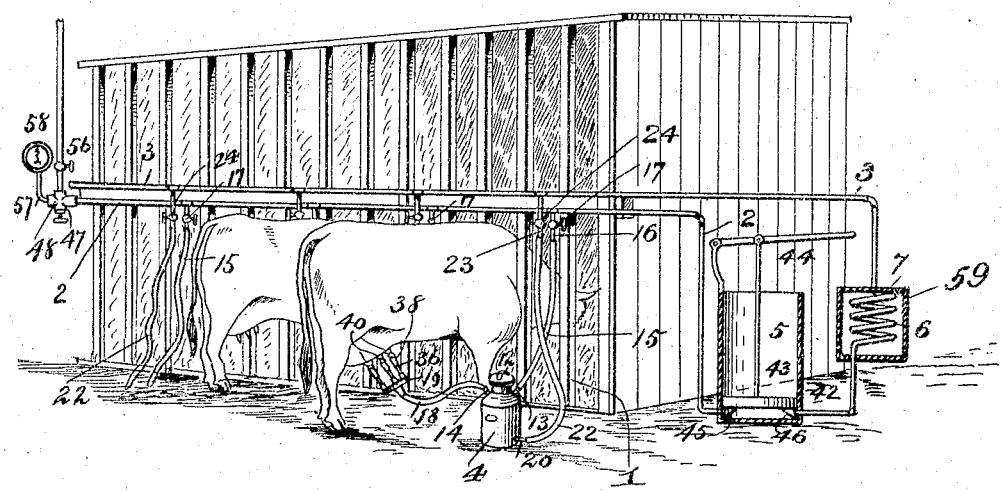
Witnesses
F. L. Ourand
C. A. Willson
Inventor
Francis M. Devore.
By A. R. Willson
Attorney

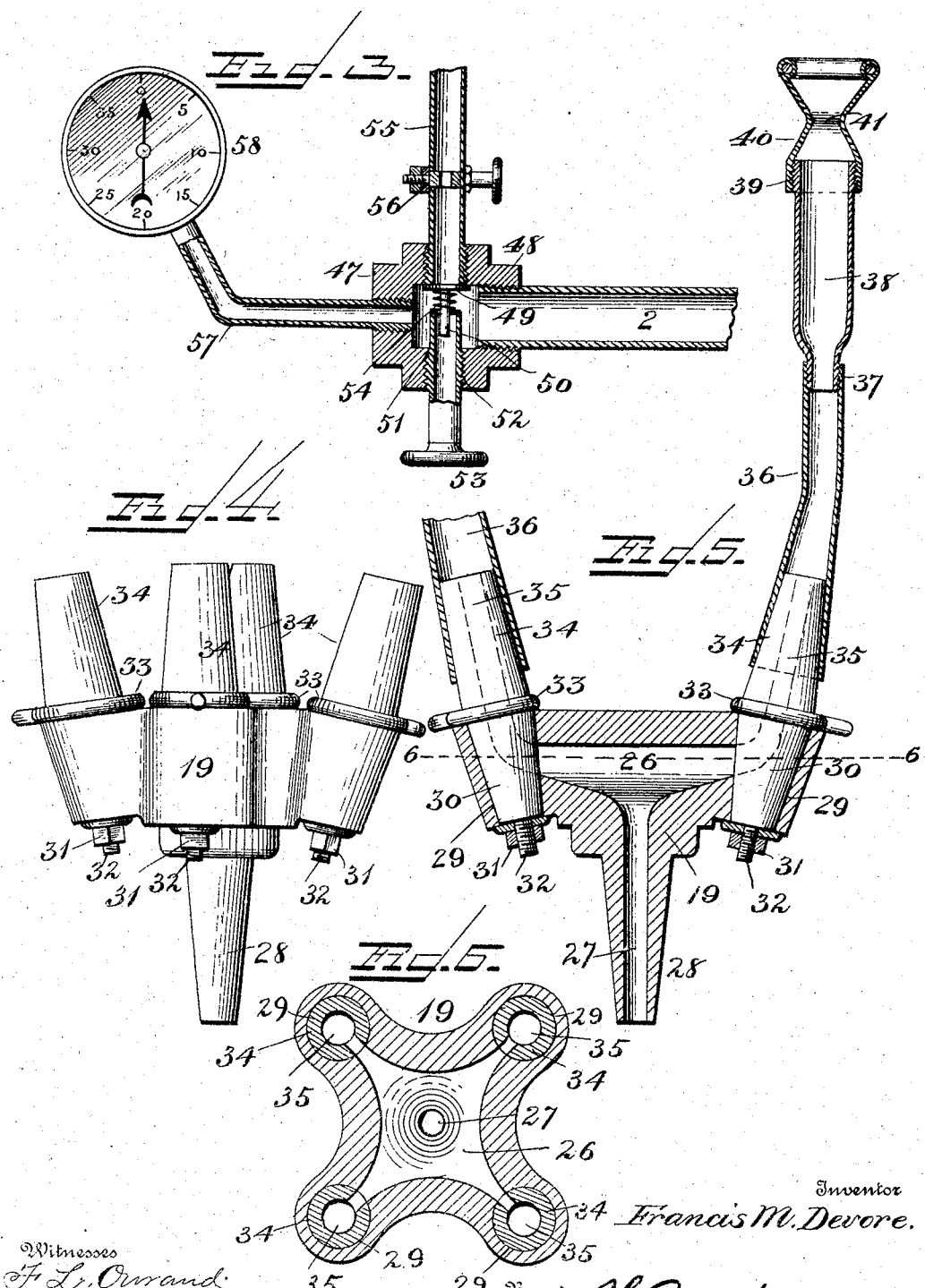

No. 778,227.  
Patented December 27, 1904.

UNITED STATES PATENT OFFICE.

FRANCIS M. DEVORE, OF THOMPSON, IOWA, ASSIGNOR TO MARTHA A. DEVORE, OF THOMPSON, IOWA.

COW-MILKER.

SPECIFICATION forming part of Letters Patent No. 778,227, dated December 27, 1904.

Application filed March 28, 1904. Serial No. 200,395.

*To all whom it may concern:*

Be it known that I, FRANCIS M. DEVORE, a citizen of the United States, residing at Thompson, in the county of Winnebago and State of Iowa, have invented certain new and useful Improvements in Cow-Milkers; and I do declare the following to be a full, clear, and exact description of the invention, such as will enable others skilled in the art to which it appertains to make and use the same.

My invention relates to improvements in apparatus for milking cows; and it consists in certain novel features of construction, combination, and arrangement of parts hereinafter fully described and claimed.

One object of my invention is to combine with the cow-milking means a simple and effective means for cooling the milk.

Another object of my invention is to provide simple and efficient connections between the teats of the cow and the milk-receptacle, which may be readily taken apart to permit them to be cleaned or repaired.

Another object of my invention is to improve and simplify the construction and operation of apparatus of this character, and thereby render them more efficient and durable in use and less expensive to manufacture.

These and other objects, which will appear as the nature of my invention is better understood, I accomplish by means of the apparatus illustrated in the accompanying drawings, in which—

Figure 1 is a diagrammatical view of my improved apparatus, showing it applied to a series of stanchions. Fig. 2 is a vertical sectional view through the milk-receptacle. Fig. 3 is a detail sectional view through the regulating device. Fig. 4 is a side elevation, on an enlarged scale, of the milk-extracting device or connections between the teats of the cow and the milk-receptacle. Fig. 5 is a longitudinal sectional view through the same. Fig. 6 is a transverse sectional view taken on the line 6 6 of Fig. 5.

Referring to the drawings by numerals, 1 denotes a series of stanchions, to which the cows are attached while being milked. 2 and 3 denote parallel longitudinally-extending lines of pipes, the former being an air-exhaust or vacuum pipe connecting the interior chamber of each milk receiver or container 4 with an air-pump 5 and the latter a cooling medium or cold-air-supply pipe connecting the exterior chamber of each of the said milk-receivers to said pump and having a portion 6 coiled within a cooling device 7.

The receivers or containers 4 may be of any desired form and construction, but are preferably cylindrical, similar to an ordinary milk-can, and each comprises outer and inner concentric cylindrical shells which provide an inner milk chamber or compartment 8 and an outer surrounding cooling medium or air chamber or compartment 9, as clearly shown in Fig. 2. The bottom of said inner cylinder which forms the milk-chamber is formed with a dome 10 to expose a greater amount of surface to the action of the cooling medium within the chamber 9, and the top or neck 11 of said cylinder is provided with a sealed cover 12. The top of said inner cylinder is also provided with two connections or nipples 13 and 14, the nipple 13 being connected by a flexible hose 15, of rubber or other material, to a pipe 16, tapped into the air-exhaust pipe 2 and provided with a controlling-valve 17, by means of which the receptacle which it controls may be thrown out of operation without affecting the operation of the other receptacles 4, and the nipple 14 being connected by a similar flexible hose 18 to a head 19, carrying the teat-cups 40, as presently explained. Said outer cylinder has a connection or nipple 20 to connect its interior 8, by means of a flexible hose or other detachable coupling 22, with a pipe 23, which is tapped into the cold-air-supply pipe 3 and provided with a controlling-valve 24, by means of which the supply of cold air to the receptacle 4, which it controls, may be cut off when the latter is not being used. The said outer cylinder is also provided with a small discharge-opening 25 to permit the cold air forced into its chamber 8 through the pipe 23 to escape to the atmosphere and cause a circulation in said chamber. The said head 19 is preferably in the form of a casting comprising a body portion formed with a central cavity 26, which communicates with a bore 27 in a central depending stem 28, to which the hose 18 is attached, and with tapered circular openings 29, in which tapered turning-plug valves 30 are inserted and retained by nuts 31, screwed upon their lower reduced screw-threaded ends 32, which project through the lower ends of said openings 29, as clearly shown in Fig. 5. The upper portions of said plug-valves 30, which project above the upper ends of the openings 29, are formed with enlargements 33 and tapered ends 34. Said enlarged portions 33 form handles, by means of which said plug-valves may be turned in the openings 29 to cause the passages or bores 35 in said valves to be moved into or out of communication with the central cavity 26 in the head 19, as shown in Figs. 5 and 6 of the drawings. Each of the tapered nipples or ends 34 is connected by a short flexible hose 36 to the reduced screw-threaded end 37 of a hollow cylindrical tube 38, made, preferably, of glass or other transparent material, and provided at its opposite end with a screw-threaded portion 39, upon which is screwed a teat-cup 40, as shown. Said teat-cup is preferably constructed of thin and very elastic rubber and is made with a contracted portion or neck 41, which permits it to firmly engage the teat of a cow.

The pump 5, which exhausts the air from the milk-chambers 8 of the receptacles 4 and forces it after being cooled in the device 7 through the air-chambers 9 of said receptacles, may be of any suitable form and is preferably a power-pump operated by a suitable motor, although in the drawings I have illustrated a conventional form of hand-pump which comprises a cylinder 42, a piston 43, reciprocated in said cylinder by means of a pivoted hand-lever 44, and suitable check-valves 45 and 46, as shown. It will be seen upon reference to the drawings that upon the upstroke of the piston air will be drawn into the cylinder through the pipe 2 from each of the milk-chambers 9 of the receptacles 4 and also from a regulating device 47 (shown more clearly in Fig. 3) and upon the downstroke of said piston the air in the cylinder will be forced through the cooling device 7 and then through pipe 4 and the chambers 9 of the receptacles 4. The said regulator 47 comprises a hollow casting 48, screwed upon the end of the pipe 2 and containing a sliding check-valve 49, the stem 50 of which slides in a tubular guide 51, externally screw-threaded at 52 and extending through a similarly-screw-threaded opening in the casting. The outer end of said guide is provided with a hand-piece 53, by means of which it may be turned to adjust the tension of a coil-spring 54, which surrounds the stem 50 and is confined between the rear face of the valve and the inner end of the guide. The said valve 49 controls the inlet of air into the pipe 2 through a pipe 55, which extends to the exterior of the barn or other building in which the apparatus is located and is open to the atmosphere. Said pipe 55 is also provided with a controlling-valve 56 of the turning-plug type, as shown. Tapped into the casting 48 is a pipe 57, upon the upper end of which is a vacuum-gage 58 of any suitable construction, to which reference is had when adjusting the valves 49 and 56, in order to obtain the desired pressure within the milk-chambers 8 of the receptacles 4.

Within the scope of my invention any suitable form of cooling device may be employed. As illustrated, a box or receptacle 59, which may be cooled by ice or a suitable chemical mixture, is provided, and the portion 6 of the pipe 2 is coiled or otherwise formed to provide a circuitous passage through said box to enable the air passing through said pipe to be thoroughly chilled.

The operation of my invention will be readily understood from the foregoing description, taken in connection with the accompanying drawings, and the following brief statement: After the teat-cups 40 are properly applied to the teats of the cows to be milked and the valves 30, 17, 24, 49, and 56 are properly adjusted the pump 5 is set in motion to exhaust the air from the milk-chambers 9, pipe 2, and the other connections and to force it through the cooling device 7, pipe 2, and air-chambers 8, as previously stated. It will be seen that by properly adjusting said valves the vacuum or suction within the milk-chambers at each stroke of the pump-piston may be readily regulated so as to produce an intermittent flow of milk from the cow, and thereby obtain the same result as that produced by a calf or by hand-milking. It will be further noted that the air drawn into the apparatus is taken from the outside of the building and is therefore not contaminated with the usual barn-odors and that the various parts of the apparatus are detachably connected and of very simple construction, so that they may be quickly and easily taken apart and cleaned.

While I have shown and described the preferred embodiment of my invention, I wish it understood that I do not limit myself to the precise construction herein set forth, since various changes in the form, proportion, and the minor details of construction may be resorted to without departing from the principle or sacrificing any of the advantages of this invention.

Having thus described my invention, what I claim as new, and desire to secure by Letters Patent, is—

1. In an apparatus of the class described, the combination of a container having milk and cooling-medium compartments, a milk-extracting device in communication with said milk-compartment, and means for exhausting the air from said milk-compartment and forcing it through said cooling-medium compartment, substantially as described.

2. In an apparatus of the class described, the combination of a container having milk and cooling-medium compartments, a milk-extracting device in communication with said milk-compartment, and means for simultaneously exhausting air from said milk-compartment and forcing a cooling medium through said cooling-medium compartment, substantially as described.

3. In an apparatus of the class described, the combination of a container having milk and cooling-medium compartments, a milk-extracting device in communication with said milk-compartment, means for exhausting the air from said milk-compartment and forcing it through said cooling-medium compartment, and means for cooling said air before it enters said cooling-medium department, substantially as described.

4. In an apparatus of the class described, the combination of a container having milk and cooling-medium compartments, a milk-extracting device in communication with said milk-compartment, a cooling device, and a pump for simultaneously exhausting air from said milk-compartment and forcing it through said cooling device and said cooling-medium compartment, substantially as described.

5. In an apparatus of the class described, the combination of a plurality of receptacles each having a milk-compartment and a cooling-medium compartment, milk-extracting devices in communication with said milk-compartments, a pump, connections between said pump and said milk-compartments, a cooling device, a connection between said cooling device and said pump, and connections between said cooling device and said cooling-medium compartments, substantially as described.

6. In an apparatus of the class described, the combination of a plurality of receptacles each having a milk-compartment and a cooling-medium compartment, milk-extracting devices in communication with said milk-compartments, a pump, an air-exhaust pipe communicating with said pump, an air-supply pipe communicating with said pump, valved connections between said milk-compartments and said air-exhaust pipe, valved connections between said cooling-medium compartments and said air-supply pipe, an inlet-valve in said air-exhaust pipe, and means for cooling the air passing through said air-supply pipe, substantially as described.

7. In an apparatus of the class described, the combination of a plurality of receptacles each having a milk-compartment and a cooling-medium compartment, milk-extracting devices in communication with said milk-compartments, a pump, an air-exhaust pipe communicating with said pump, an air-supply pipe communicating with said pump, valved connections between said milk-compartments and said air-exhaust pipe, valved connections between said cooling-medium compartments and said air-supply pipe, an inlet-valve in said air-exhaust pipe, a cooling-receptacle containing a cooling medium, and a pipe-coil in said cooling-receptacle in communication with said air-supply pipe, substantially as described.

8. In an apparatus of the class described, the combination of a receptacle having a milk-compartment and a cooling-medium compartment, a milk-extracting means adapted to afford communication between the teats of a cow and said milk-compartment, a pump, an air-exhaust pipe connected to said pump, an air-supply pipe connected to said pump, a connection between said air-exhaust pipe and said milk-compartment, a connection between said cooling-medium compartment and said air-supply pipe, means for cooling the air passing through said air-supply pipe, and an adjustable regulator-valve for admitting air into said air-exhaust pipe, substantially as described.

9. In an apparatus of the class described, the combination with a milk-extracting device, an air-exhaust pipe, and a cooling-medium supply-pipe, of a container comprising inner and outer shells forming an inner milk-compartment and a surrounding cooling-medium compartment, said outer shell having an air-discharge opening and a connection for said cooling-medium supply-pipe, and said inner shell having an air-tight cover, a connection for said air-exhaust pipe, and a connection for said milk-extracting device, substantially as described.

In testimony whereof I have hereunto set my hand in presence of two subscribing witnesses.

FRANCIS M. DEVORE.

Witnesses:
  E. E. Dunn,
  Albert Sühring.